US007412650B2

(12) United States Patent
Gallo

(10) Patent No.: US 7,412,650 B2
(45) Date of Patent: Aug. 12, 2008

(54) METHOD OF REPRESENTING INFORMATION ON A THREE-DIMENSIONAL USER INTERFACE

(75) Inventor: Anthony Carmen Gallo, Toronto (CA)

(73) Assignee: Vizible Corporation, Toronto, Ontario (CA)

(*) Notice: Subject to any disclaimer, the term of this patent is extended or adjusted under 35 U.S.C. 154(b) by 545 days.

(21) Appl. No.: 10/139,374

(22) Filed: May 7, 2002

(65) Prior Publication Data

US 2002/0163546 A1 Nov. 7, 2002

Related U.S. Application Data

(60) Provisional application No. 60/288,818, filed on May 7, 2001.

(51) Int. Cl.
G06F 3/00 (2006.01)
(52) U.S. Cl. .................... 715/700; 715/503
(58) Field of Classification Search ............ 715/782, 715/848, 849, 850, 851, 852
See application file for complete search history.

(56) References Cited

U.S. PATENT DOCUMENTS

| | | | |
|---|---|---|---|
| 5,148,154 A | 9/1992 | MacKay et al. | |
| 5,303,388 A | 4/1994 | Kreitman et al. | |
| 5,339,390 A | 8/1994 | Robertson et al. | |
| 5,485,197 A | 1/1996 | Hoarty | |
| 5,515,486 A | 5/1996 | Amro et al. | |
| 5,602,564 A * | 2/1997 | Iwamura et al. | 715/782 |
| 5,678,015 A | 10/1997 | Goh | |
| 5,813,007 A * | 9/1998 | Nielsen | 707/10 |
| 5,838,326 A | 11/1998 | Card et al. | |
| 5,880,733 A | 3/1999 | Horvitz et al. | |
| 5,883,625 A | 3/1999 | Crawford et al. | |
| 5,909,217 A * | 6/1999 | Bereiter | 715/854 |

(Continued)

FOREIGN PATENT DOCUMENTS

EP 0 483 777 A2 6/1992

(Continued)

OTHER PUBLICATIONS

Bederson et al, Pad++: A Zooming Graphical Interface for Exploring Alternate Interface Physics, UIST, 1994, pp. 1-10.*

(Continued)

*Primary Examiner*—David Wiley
*Assistant Examiner*—Ryan F Pitaro
(74) *Attorney, Agent, or Firm*—Bereskin & Parr

(57) ABSTRACT

The present invention relates to a method of representing information on a three-dimensional user interface having multiple portals, in which data is associated with each of the portals. A symbolic marker is associated with each of the portals according to a pre-specified scheme, and displayed in the respective portals. In a preferred embodiment of the invention, the symbolic marker is a colored marker. By color-coding the portals, data associated with the portals can be classified into a number of categories to provide the user with a summary of the data on the three-dimensional user interface at a high level of abstraction. The three-dimensional user interface may be adapted to update the colored markers more efficiently, and to display them using less computing resources than would be required if more memory-sensitive visual cues were displayed.

20 Claims, 12 Drawing Sheets

U.S. PATENT DOCUMENTS

| | | | |
|---|---|---|---|
| 6,005,579 A | 12/1999 | Sugiyama et al. | |
| 6,016,145 A | 1/2000 | Horvitz et al. | |
| 6,104,391 A | 8/2000 | Johnston, Jr. et al. | |
| 6,125,375 A * | 9/2000 | Atkins et al. | 715/502 |
| 6,160,554 A * | 12/2000 | Krause | 715/804 |
| 6,243,089 B1 * | 6/2001 | Gong | 715/744 |
| 6,262,736 B1 | 7/2001 | Nelson | |
| 6,307,574 B1 | 10/2001 | Ashe et al. | |
| 6,621,509 B1 | 9/2003 | Eiref et al. | |
| 6,628,313 B1 | 9/2003 | Minakuchi et al. | |
| 6,633,910 B1 * | 10/2003 | Rajan et al. | 709/224 |
| 6,636,246 B1 | 10/2003 | Gallo et al. | |

FOREIGN PATENT DOCUMENTS

| | | | |
|---|---|---|---|
| EP | 0 767 418 A | 4/1997 | |

OTHER PUBLICATIONS

Young, New Ways of Organizing Data Could Change Nature of Computers, Apr. 4, 1997, pp. 1-3.*

Welz, Zooming Through Information Space on Pad++, Discovery Publishing Group, Jun. 1995, pp. 1-8.*

Levy, Steven, "Screen Wars", Dec. 11, 2000, Newsweek, p. 67-69.

McCracken, Harry, "CubicEye Invites you to Browse the Web in 3D", Apr. 5, 2001, PCWORLD.COM.

Santos, Roy, "Give your Web-Surfing Experience New Depth with the CubicEye 3D Browser", Apr. 16, 2001, TechTV.

"Virtual Reality Menu Systems", IBM Technical Disclosure Bulletin, IBM Corp. New York, U.S., vol. 36, No. 12, Dec. 1, 1993, p. 227-228.

http://www.2ce.com/Cubiceye.php, "CubicEye", 2ce, Inc.

http://www.2ce.com/information.html, "Information", 2ce, Inc.

* cited by examiner

METHOD OF REPRESENTING INFORMATION ON A THREE-DIMENSIONAL USER INTERFACE

FIELD OF THE INVENTION

The present invention relates to user interfaces. More specifically, the present invention relates to a method of representing information on a three-dimensional user interface.

BACKGROUND OF THE INVENTION

The assignee of the present invention has developed a novel three-dimensional user interface that allows a user to intuitively locate and access resources from a computing device. The user may interact with the user interface, which appears to exist in a three-dimensional space, and which can be projected onto various display means. Accordingly, the user interface can also be referred to as a Spatial User Interface, or a SUI. Various embodiments of the SUI are described in pending U.S. application Ser. No. 09/527,917 filed Mar. 17, 2000, and in pending U.S. application Ser. No. 09/809,330 filed Mar. 16, 2001.

The SUI, in a preferred embodiment described in the pending applications, comprises multiple portals. Each portal, when not empty, may contain sensory cues to provide a cue, preferably a visual cue, as to the content contained within the portal or to the data associated with the portal in which the sensory cue is located. Sensory cues are associated with an application and may correspond to any type of data or content, including static or dynamic documents, three dimensional holograms or another SUI.

For example, a sensory cue displaying an image of a movie may be associated with an MPEG player to play the movie. A sensory cue showing a page of a spreadsheet may be associated with a spreadsheet application. A sensory cue showing a web page may have a web browser associated with it.

One form of sensory cue is a snapshot of a window used by the associated application (e.g. a web page or a page of a text document) when the application was last active. A snapshot is a way to automatically generate a relevant image for a sensory cue, as it simply takes a picture or snapshot of a screen to be used as a visual cue. However, the snapshot is merely a representation of the underlying content or data that does not support user interaction with the content or data represented by the sensory cue.

In an embodiment of the SUI described in the pending applications, a portal can also be selected by the user. The selected portal is also referred to as an active portal. When a portal becomes active, the SUI is rotated to have the portal face the user. The sensory cue within the portal is enlarged for better viewing and the portal frame is altered to highlight the portal. The active portal is then made large enough for user interaction upon double-clicking the portal, for example, and any application associated with the portal is activated. This permits user interaction with the content or data associated with the portal.

Where many of the sensory cues contained in portals of a SUI are visual cues such as pictures or snapshots, an increasingly large amount of computing resources (e.g. processing power, memory) may be required to display all the visual cues within the portals of the SUI, particularly where the visual cues may be composed of memory intensive graphics (e.g. bitmap images), and particularly when the number of portals which comprise the SUI becomes increasingly large (e.g. thousands of portals). Furthermore, as the number of portals in a SUI increases in size, it becomes increasingly difficult to continuously update sensory cues contained in portals to reflect rapidly changing content or data associated with the portal. It also becomes increasingly difficult for users to determine the nature of the content or data being associated with the different portals of the SUI.

SUMMARY OF THE INVENTION

The present invention relates generally to three-dimensional user interfaces.

In one aspect of the present invention, the present invention relates to a method of representing information on a three-dimensional user interface, said three-dimensional user interface comprising a plurality of portals, said method comprising the steps of associating data with each of the plurality of portals, associating a symbolic marker with each of the plurality of portals that represents the data associated therewith, and displaying the symbolic marker in each of the plurality of portals associated therewith, such that the three-dimensional user interface can be displayed in an active state and at least two non-active states, wherein each non-state is one of a symbolic state or a passive state.

In another aspect of the present invention, the symbolic marker is a coloured marker.

In another aspect of the present invention, the present invention also relates to a method of representing information on a three-dimensional user interface further comprising the step of: upon receiving at least one first pre-specified user input, wherein the at least one first pre-specified user input identifies a first designated portal of the plurality of portals, displaying a sensory cue in each of a subset of the plurality of portals, wherein the sensory cue displayed in a portal of the subset facilitates recognition of the data associated with the portal of the subset.

In another aspect of the present invention, the present invention also relates to a method of representing information on a three-dimensional user interface further comprising the step of: upon receiving at least one second pre-specified user input, wherein the at least one second pre-specified user input identifies a second designated portal, executing an application and displaying the output of the application to a user, wherein the application permits user interaction with data associated with the second designated portal.

In another aspect of the present invention, the present invention also relates to a method of representing information on a three-dimensional user interface wherein a first image of the three-dimensional user interface is projected onto a two-dimensional display for viewing by a user before receiving the at least one first pre-specified user input, and wherein the first image is replaced by a second image of the subset of the plurality of portals, which is shown in the two dimensional display magnified as compared to the first image, after receiving the at least one first pre-specified user input. The present invention also relates to a method of representing information on a three-dimensional user interface wherein the second image is replaced by a third image of the second designated portal, which is shown in the two-dimensional display magnified as compared to the second image, after receiving the at least one second pre-specified user input, wherein the second designated portal is used to display the output of the application to the user.

In another aspect of the present invention, the present invention also relates to a method of representing information on a three-dimensional user interface further comprising the steps of detecting a change in data associated with at least one monitored portal of the plurality of portals, and associating a different symbolic marker for display in the at least one monitored portal after the change.

In another aspect of the present invention, the present invention also relates to a method of representing information on a three-dimensional user interface wherein the plurality of portals on the three-dimensional user interface are arranged such that portals are grouped together on the three-dimensional user interface according to a grouping scheme.

In another aspect of the present invention, the present invention also relates to a user interface for a computing device, the user interface comprising a graphic representation of a plurality of portals arranged in a three-dimensional space, the user interface comprising a module for displaying symbolic markers in the plurality of portals, wherein the module is programmed to execute the steps of a method of the present invention.

In another aspect of the present invention, the present invention also relates to a module for displaying symbolic markers in a plurality of portals of a user interface, the user interface comprising a graphic representation of a plurality of portals arranged in a three-dimensional space, wherein the module is programmed to execute the steps of a method of the present invention.

The present invention facilitates the representation of data in a three-dimensional user interface at different levels of abstraction. For example, in a preferred embodiment of the present invention, portals of the three-dimensional user interface are colour-coded using coloured markers, according to a pre-specified criteria or colour-coding scheme. By colour-coding the portals, data associated with the portals can be classified into categories to provide the user with a summary of the data on the three-dimensional user interface at a high level of abstraction. By displaying a coloured marker in each portal, which may require less computing resources to display than other more memory-intensive visual cues, a SUI with a large number of portals can often be scanned efficiently by a user for data in different categories of interest. Sensory cues, including visual cues, that may require more computing resources to display, need only be displayed for a selected group of portals.

Furthermore, where data is continuously changing and where a SUI is designed to reflect changes to the data in the symbolic markers displayed in its portals, updating the SUI at this high level of abstraction may be done more efficiently. The present invention may also permit changes to the data to be more readily apparent to the user.

In other embodiments of the invention, symbolic markers other than coloured markers may be used to represent data or content associated with a portal. Different symbolic markers may be used to represent the data or content at varying levels of abstractions, and numerous levels or layers of data or content can be represented in a SUI.

BRIEF DESCRIPTION OF THE DRAWINGS

For a better understanding of the present invention, and to show more clearly how it may be carried into effect, reference will now be made, by way of example, to the accompanying drawings used to aid in the description of preferred embodiments of the present invention, and in which.

DETAILED DESCRIPTION OF THE PREFERRED EMBODIMENTS

In preferred embodiments, the present invention relates to three-dimensional user interfaces. Some examples of three-dimensional user interfaces are described as embodiments of a Spatial User Interface (SUI). These embodiments are described in pending U.S. application Ser. No. 09/527,917 filed Mar. 17, 2000, and in pending U.S. application Ser. No. 09/809,330 filed Mar. 16, 2001, the contents of which are hereby incorporated by reference.

Figure 1:
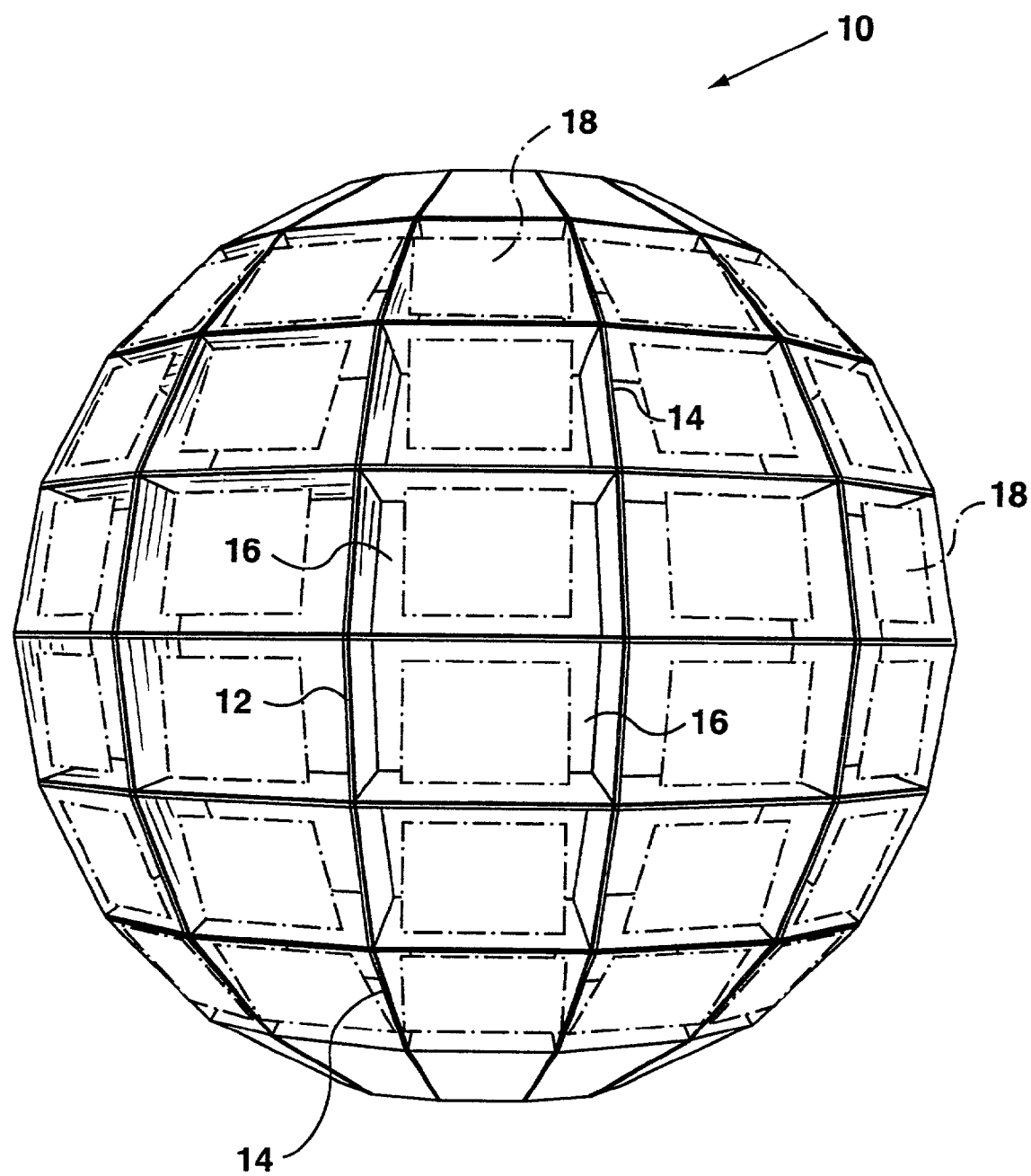
FIG. 1 is an elevational view of an embodiment of a SUI.

Referring to FIG. 1, an elevational view of an embodiment of a SUI is shown generally as 10. SUI 10 preferably includes an armature 12 having a plurality of ribs 14. Ribs 14 define a plurality of portals 16. Portals 16 may be empty or may contain sensory cues 18.

Figure 2:
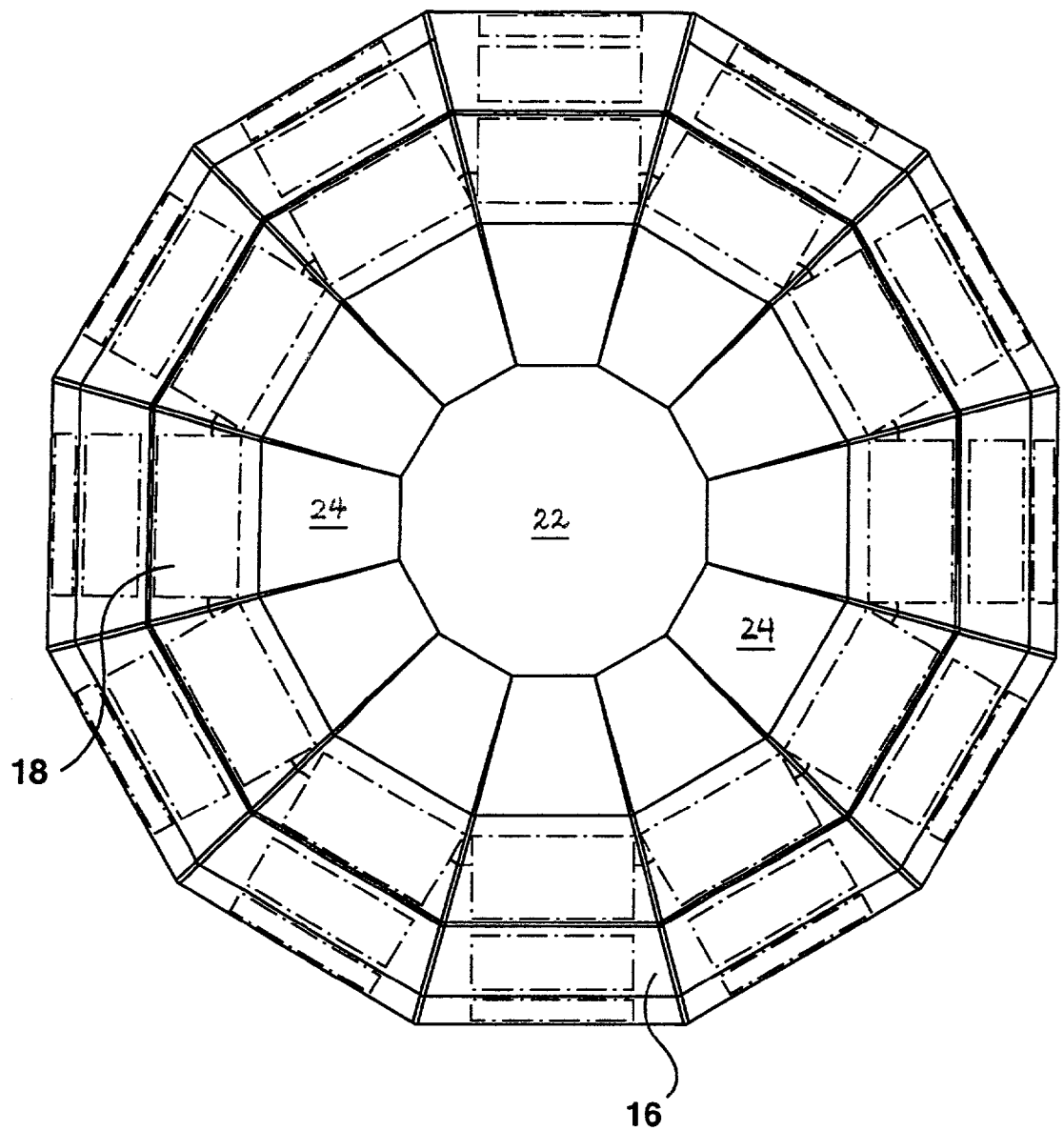
FIG. 2 is a plan view of a polar cap of a SUI.

Referring to FIG. 2, a plan view of a polar cap of an embodiment of a SUI 10 is shown. SUI 10 has two polar caps 22, which can be used for easily identifying a SUI 10 when it is minimized, for example. A user may name or otherwise customize the look of the SUI 10 by changing the image applied to the polar caps 22. Labels 24 reside between portals 16 and polar cap 22. Labels 24 may be used to identify groups of portals on the SUI 10, or can be used as buttons to perform any predetermined function. As with portals 16 and polar caps 22, the user may be able to change the contents of the labels 24, to aid the user in identifying a specified group of portals or a specific function.

Referring again to FIG. 1, sensory cues 18 serve to provide a cue as to the content within the portal 16 in which they are located. Most preferably, the sensory cue 18 is a visual cue, however, cues associated with other senses are contemplated when advancements in technology will permit such cues to be utilized (e.g. smell, sound, touch, taste). For example, sensory cue 18 may be a visual still image (e.g. a bitmap, a JPEG, or an image in any other known image format), a visual animated image (e.g. an animated GIF, or an image in any other known image format), a video (e.g. an MPEG, or a video represented in QuickTime™ or RealPlayer™ format or in any other known video format), a sound or a music clip, text, or a document file (e.g. a Microsoft Word™ document, an HTML document, an XML document, a document in another web format, or a document in any other known format). Further transformations or effects may also be applied to sensory cue 18 (e.g. wholly or partially) for display in portal 16. These effects may include, for example, visual effects (e.g. changes in texture, hue, saturation, shade, highlighting, and contrast) or geometric effects (e.g. changes in size, scale, or the application of a translation, transformation, or rotation effect).

Effectively, sensory cues 18 associated with an application may correspond to any type of data or content, including static or dynamic documents, three-dimensional holograms, or another SUI 10. One form of sensory cue 18 is a snapshot of a window used by the associated application when the application was last active. In this example, the snapshot is used as a visual cue representing the underlying content.

Figure 3:
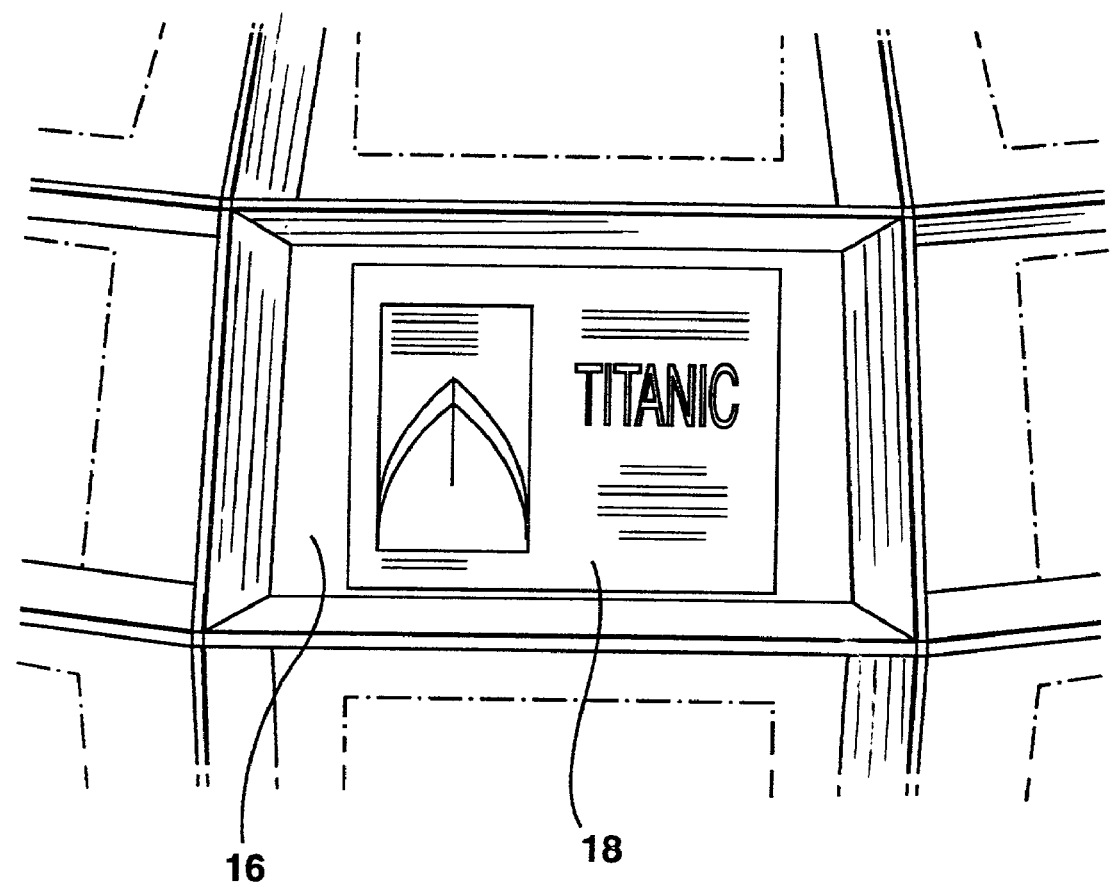
FIG. 3 is an elevational view of a portal containing a visual cue.

Referring to FIG. 3, an elevational view of a portal 16 containing a sensory cue 18 in the form of a visual cue is shown. By using sensory cues 18 in a SUI 10, SUI 10 provides a means for representing the content or data associated with portal 16, which gives the user an idea of what content or data is associated with portal 16 without having to display the actual content or data in portal 16 or to facilitate user interaction with that content or data at any given time.

A SUI 10 can exist in a large number of different embodiments. For example, the SUIs 10 of FIGS. 1 and 2 each have an armature 12 having a plurality of ribs 14 that define a plurality of portals 16. However, other embodiments of SUI 10 might not comprise an armature 12 and ribs 14 to define portals. In the case where SUI 10 does not comprise an armature 12 or ribs 14, the sensory cues 18 themselves define the portals 16, and therefore, the sensory cues 18 may appear to be floating on the surface of the SUI 10. Empty portals 16 may be defined by "empty" sensory cues 18 (e.g. a blank image). The SUI 10 of FIGS. 1 and 2 also contain polar caps 22 and labels 24. However, other embodiments of SUI 16 might not comprise polar caps 22 and/or labels 24. The number of portals 16 in a SUI 10 and the arrangement of portals 16 on a SUI 10 can also be different in alternative embodiments of a SUI 10.

Figure 4:
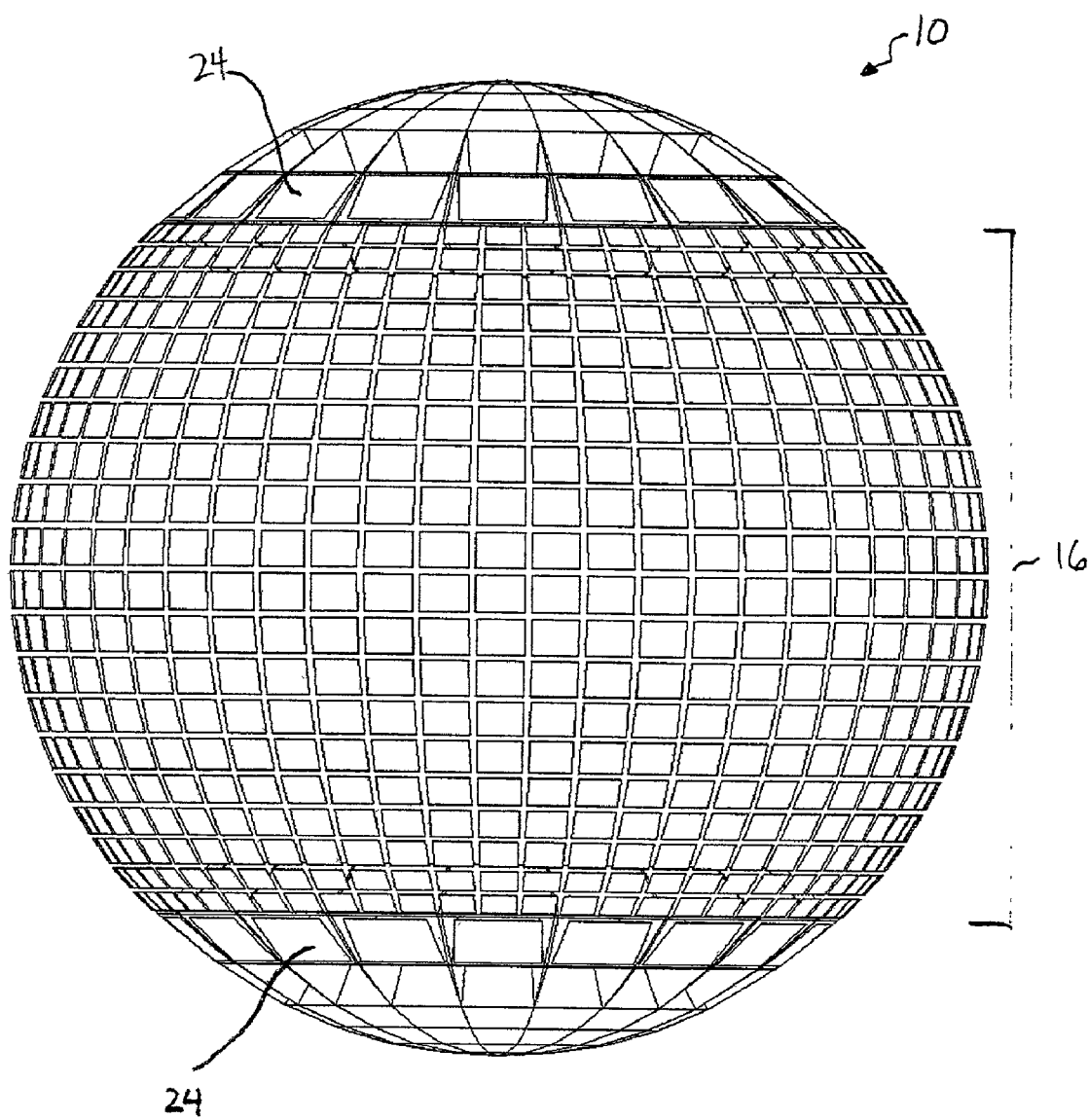
FIG. 4 is an elevational view of an alternate embodiment of a SUI.

For example, FIG. 4 shows an elevational view of an alternate embodiment of a SUI 10. In this illustration, there is a relatively larger number of portals 16 than the number of portals 16 displayed in the SUI 10 of FIG. 1. Furthermore, the embodiment of SUI 10 shown in FIG. 4 does not comprise an armature 12 or ribs 14. Although the present invention can be applied to a three-dimensional user interface having any number of portals, the present invention may be particularly useful where the number of portals 16 in a SUI 10 is relatively large.

According to one preferred embodiment of the present invention, portals 16 are colour-coded, permitting data or content in a SUI 10 to be represented to the user at a high level of abstraction. At this high level of abstraction where colour-coding is used, a user only knows that the data associated with a portal 16 falls under a specific category, but because neither a sensory cue 18 displaying a portion of the underlying content or data (e.g. as in a visual snapshot of a document) nor the actual underlying content or data are displayed, it is not possible for the user to ascertain more specific details about the data (other than the fact that it falls under a specific category) merely from the colour of the portals at this high level of abstraction. A SUI 10 which is capable of supporting the colour-coding of portals 16 to permit data or content to be represented to the user at this high level of abstraction may also be referred to as a Spatial Colour Map Interface (SCMI).

Figure 5:
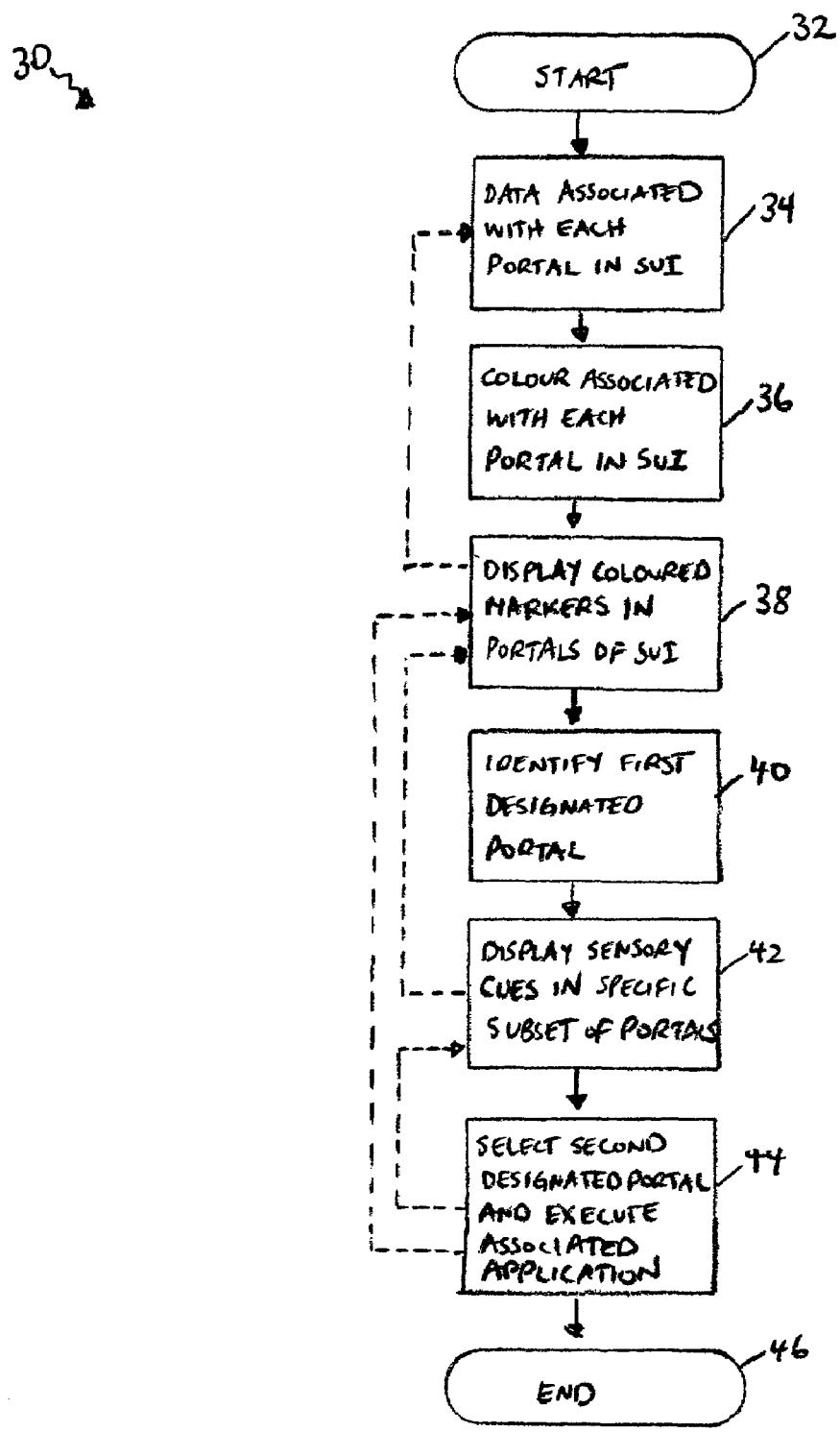
FIG. 5 is a flowchart illustrating the steps of a method of representing information on a SUI according to an embodiment of the present invention.

FIG. 5 is a flowchart illustrating the steps of a method of representing information on a SUI 10 according to an embodiment of the present invention, the method shown generally as 30. The method commences at step 32.

Method 30 of the present invention described herein with reference to FIG. 5, for ease of exposition, has been described in relation to a particular preferred embodiment, in which coloured markers are used to represent data at different levels of abstraction. In this embodiment, a coloured marker is "symbolic" of a portal's underlying data or content, in that it is a representation of that data or content. Generally, however, the use of coloured markers is not required in every implementation and embodiment of the present invention. Any symbolic marker, of which a coloured marker is only one type, may be used to represent data at different levels of abstraction in accordance with the present invention. A symbolic marker is something that represents data or content that underlies (i.e. is contained in or is associated with) a portal. For example, since a symbolic marker is merely a representation of underlying data or content, anything that can serve as a sensory cue (as was described in greater detail with reference to FIG. 1) can be used as a symbolic marker in accordance with the present invention.

At step 34, data is associated with each portal 16 in the SUI 10. For example, a SUI 10 may represent a portfolio of stocks. Each portal 16 is associated with data relating to a stock in the portfolio, and the data may comprise the current price of the stock. In that case, the price of a stock in the portfolio would be associated with a specified portal 16 in the SUI 10 at this step.

At step 36, a colour is associated with each portal 16 in the SUI 10 based on the data associated with the portal 16, according to some pre-specified criteria or scheme for colour-coding the portals 16. For example, the criteria may be embodied in a simple condition, such that if the data associated with a portal 16 is such that the condition is satisfied, a first colour is associated with the portal 16, otherwise, a second colour is associated with the portal 16. Alternatively, the criteria may be embodied in multiple conditions or rules, such that if the data associated with a portal 16 is such that a first condition is satisfied then a first colour is associated with the portal 16, if the data associated with a portal 16 is such that a second condition is satisfied then a second colour is associated with the portal 16, if the data associated with a portal 16 is such that a third condition is satisfied then a third colour is associated with the portal 16, and so on. The criteria may be defined by the user in any number of ways, as would be obvious to those skilled in the art.

As a further example, consider a SUI 10 that represents a portfolio of stocks, where each portal 16 is associated with data relating to a stock in the portfolio, and where the data comprises the current price of the stock. The criteria for colour-coding the portals 16 may require that when the price of a stock falls in a first range defined by a first specified price and a second specified price, the colour red will be associated with the portal. Similarly, if the price of a stock falls in a second range defined by a second specified price and a third specified price, the colour yellow will be associated with the portal. Further, if the price of a stock falls in a third range defined by a third specified price and a fourth specified price, the colour green will be associated with the portal. A default colour (e.g. white) might also be associated with any portal 16 not assigned a colour according to the criteria.

At step 38, a coloured marker is displayed in each of the portals 16 of the SUI 10. In this embodiment of the invention, the coloured marker displayed in a portal is coloured with the colour associated with the portal. The coloured marker may be in a variety of forms. For example, the coloured marker preferably takes the shape of the portal 16, and has the colour associated with the portal 16. Accordingly, the portal 16 will appear to the user as being effectively filled with that colour. As a further example, the coloured marker may also take the form of an icon or shape placed in the portal 16, and coloured predominantly or completely with the colour associated with the portal 16. Additional indicia such as a text or numeric label may also appear in the portal 16.

In this embodiment of the present invention, colour-coding of the portals is achieved through the use of coloured markers assigned to portals 16 according to a pre-specified criteria or colour coding scheme. There may be different advantages to using some forms of coloured markers over other forms of coloured markers or over other symbolic markers. For example, displaying a solid-coloured colour marker in each portal 16 will typically require less computing resources than what may be required to display other more memory-intensive visual cues. For example, if a user interface uses bitmap images as visual sensory cues 18, coloured markers which are vector graphic images could be used and will typically require less computing resources to display.

This may be particularly useful when the number of portals 16 in a SUI 10 is large, since it will typically take less time and memory to display the coloured markers in all of the portals 16, than it would to display bitmap visual cues in all of the portals 16. Where a user desires some or all of the portals 16 in a SUI 10 to be monitored for changes in data associated with those portals, and where the user wishes to have an indication when the data has changed in a certain way, it will also typically take less time and memory to update the colour of the coloured markers in the portals 16 to reflect such changes, than to update the display of the bitmap visual cues in all of the portals 16. Real-time changes to the colour of portals 16 in a SUI 10 may also be much easier to detect than changes to bitmap visual cues, particularly where the visual cues appear small to the user.

Colour-coding of portals using coloured markers as symbolic markers in accordance with the present invention allows data in the SUI 10 to be represented at a high level of abstraction. The colour assigned to a given portal 16 merely symbolizes the data or content associated with the portal 16 and indicates to the user that the data or content falls within a certain category or type. In this case, the data or content is not presented to the user at the same level of detail as would be available if a more detailed sensory cue 18 (e.g. a snapshot of the data or content) were to be displayed in the portal, or if the user were able to interact with the data directly in an application. Accordingly, a SUI which represents data at this high level of abstraction can also be referred to as being in a "symbolic state". In this state, users may rapidly scan the coloured markers in the portals 16 of a SUI 10 for data falling within a certain category or type of interest in accordance with this particular embodiment of the invention.

Steps 34, 36 and 38 can be repeated to allow the colour of the coloured markers in one or more portals 16 to be updated when a change in the data associated with one or more portals 16 occurs, and where the change indicates that a coloured marker should be coloured differently according to the pre-specified criteria for colour-coding the portals. The updating of the colour of the coloured markers can be performed, for example, at pre-specified time intervals (e.g. every 5 minutes or in much small intervals to simulate "real-time" updates), upon the occurrence of a pre-specified event (e.g. click of an "update" button), upon a change in data detected for one or more portals being monitored for a change in associated data, or according to any other defined scheme or criteria.

At step 40, a user can select one or more portals 16 of a SUI 10 in a symbolic state to be examined more closely. Upon a first pre-specified user input, such as a click of the left mouse button over a selected portal for example, a first designated portal is selected and identified. This permits a user to examine a specific subset of portals 16 in the SUI 10. The specific subset may be defined, for example, as the first designated portal only, a group of portals with the first designated portal at or near the centre of the group (e.g. a 3×3 rectangular grid of portals) one or more rows or columns of portals 16 containing the first designated portal, or any other defined subset of portals 16 which may or may not comprise the first designated portal.

At step 42, for each portal 16 in the specific subset of portals 16 defined at step 40, a sensory cue 18 is displayed in the portal 16. If a coloured marker is displayed in the portal 16, it is replaced with a sensory cue 18. As explained earlier, a sensory cue 18 is used to represent the actual content of a portal 16 and to facilitate recognition of the data associated with the portal 16, typically at a lower level of abstraction (i.e. more detailed) than data represented in a SUI 10 in a symbolic state. Sensory cues 18 can be visual cues, or other types of cues.

Advantageously, only some of the portals 16 of the SUI 10 are examined at this level of data representation where data is represented as more detailed sensory cues 18, but at a lower level of abstraction than when the SUI 10 is in a symbolic state. It will typically be much quicker to display the more detailed sensory cues 18 in some of the portals 16 than to display the more detailed sensory cues 18 in all portals 16 of a SUI 10. A user can then scan a SUI 10 for portals 16 that may be of interest, and examine groups of selected portals 16 in more detail by viewing the sensory cues 18 of those selected portals. A SUI 10 which represents data at a level of abstraction where sensory cues 18 are displayed in portals that more closely depicts the actual underlying data or content, but that does not permit direct interaction with that data or content can also be referred to as being in a "passive state". In this state, users can examine the sensory cues 18, which facilitate recognition of the data associated with the portals 16.

For example, consider a SUI 10 that represents a portfolio of stocks, where each portal 16 is associated with data relating to a stock in the portfolio, and where the data comprises the current price of the stock. Each sensory cue 18 displayed may comprise a snapshot of a graph showing the performance of the stock.

Where a SUI 10 is projected onto a two-dimensional display (e.g. a monitor) for viewing by a user, a view of the SUI 10 will preferably be displayed in its entirety on the two-dimensional display when the SUI 10 is in a symbolic state. Upon receiving the first pre-specified input, the SUI 10 will change to a passive state, and optionally, cause a specific subset of portals to be magnified or to appear larger on the two dimensional display, so as to provide a "zoom-in" effect.

The user can return to viewing the SUI 10 in a symbolic state by, for example, clicking the right mouse button, or by performing some other predetermined action. In this case, the flow of method steps will proceed back to step 38, otherwise the flow of method steps will proceed to step 44.

At step 44, a user can select a portal 16 from the specific subset of portals 16 of a SUI 10 in a passive state to interact with data or content associated with the selected portal 16. Upon a second pre-specified user input, such as a double-click of the left mouse button over a selected portal for example, a second designated portal is selected and identified. This permits a user to examine the second designated portal 16 of the SUI 10, and causes the SUI 10 to execute an application associated with that portal 16 that will permit the user to interact with data associated with that portal 16.

For example, consider a SUI 10 that represents a portfolio of stocks, where each portal 16 is associated with data relating to a stock in the portfolio, and where the data comprises the current price of the stock. Upon receiving the second pre-specified user input, an application may be executed to allow the user to edit a graph showing the performance of the stock or to edit past stock prices, for example.

A SUI 10 which represents data at this level of data representation where a user can interact with the data using a computer application, can also be referred to as being in an "active state". Accordingly, the states referred to as symbolic states and passive states described in earlier steps of method 30 may also be referred to as "non-active states", as these states do not permit a user to interact directly with the data or content associated with a portal. In embodiments of the invention where SUI 10 can exist in three states (i.e. symbolic state, passive state, and active state), the passive state represents an intermediate state between a symbolic state (in which data is represented at the highest level of abstraction) and the active state (in which user interaction with the data or content associated with a portal is permitted). In variant embodiments of the invention where SUI 10 can exist in more than three states, there can be multiple intermediate passive states in which data is represented at multiple intermediate levels of abstraction.

Where a SUI 10 is projected onto a two-dimensional display (e.g. a monitor) for viewing by a user, upon receiving the second pre-specified input, the SUI 10 will change to the active state, and optionally, cause the second designated portal to be magnified or to appear larger on the two-dimensional display, so as to provide a "zoom-in" effect. The application window preferably is maximized to a size that covers a substantial portion of the two-dimensional display, and the second designated portal is sufficiently enlarged accordingly to contain the application window. Alternatively, a separate application window which permits user interaction with the data associated with the second designated portal may be opened, and shown in the two-dimensional display without requiring the second designated portal to be enlarged.

The user can return to viewing the SUI 10 in a passive state by, for example, clicking the right mouse button, or by performing some other predetermined action. In this case, the flow of method steps will proceed back to step 42.

The user can also return to viewing the SUI 10 in a symbolic state directly, bypassing a passive state view of the SUI 10, by pressing the "ESC" button on a keyboard, for example, or by performing some other predetermined action. In this case, the flow of method steps will proceed back to step 38.

Otherwise, the flow of method steps proceed to step 46 which marks the end of the method of representing information on a SUI 10 according to an embodiment of the present invention.

Figure 6:
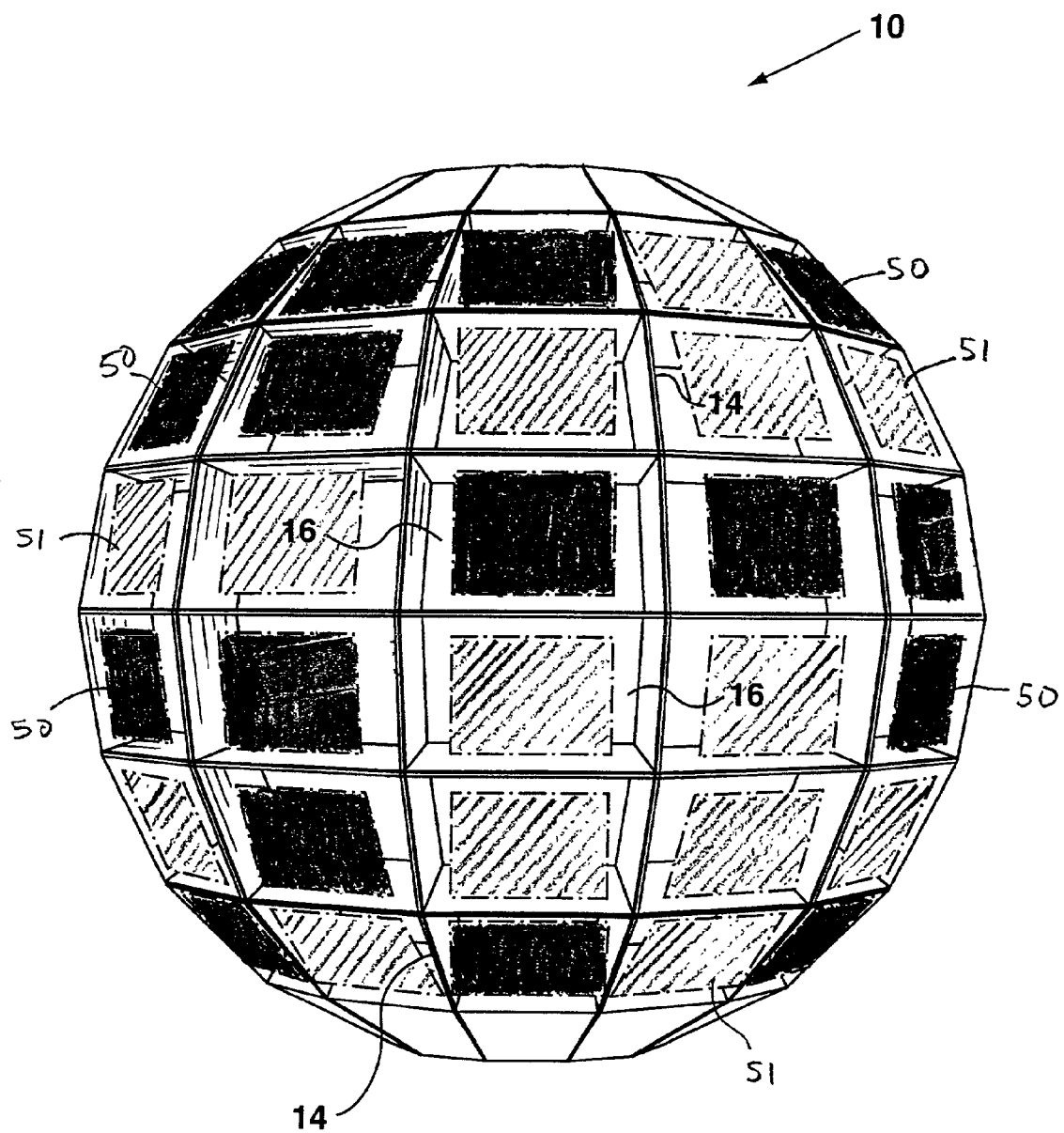
FIG. 6 illustrates a first example of a SUI representing data in a symbolic state.
Figure 7:
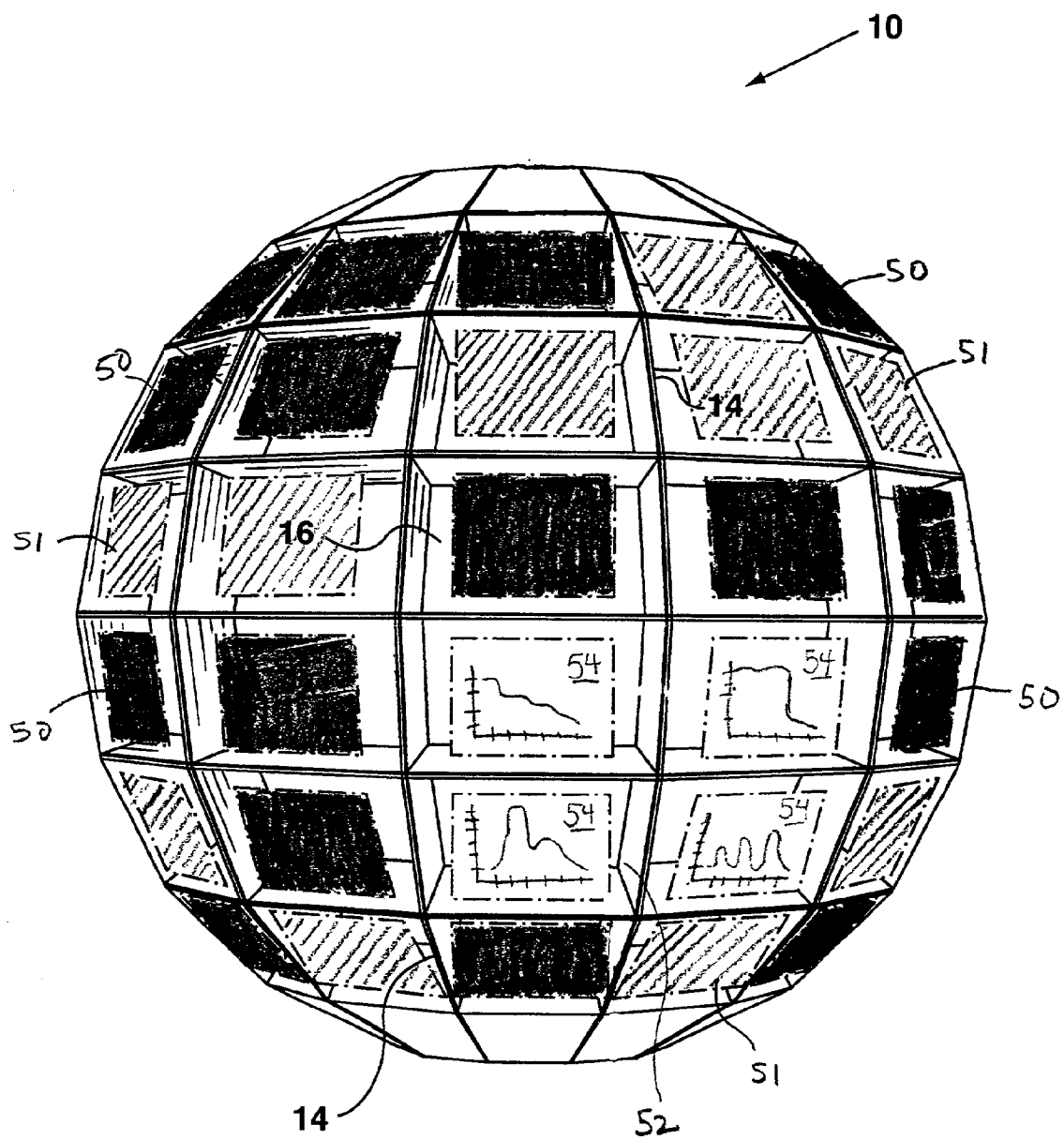
FIG. 7 illustrates a first example of a SUI representing data in a passive state.
Figure 8:
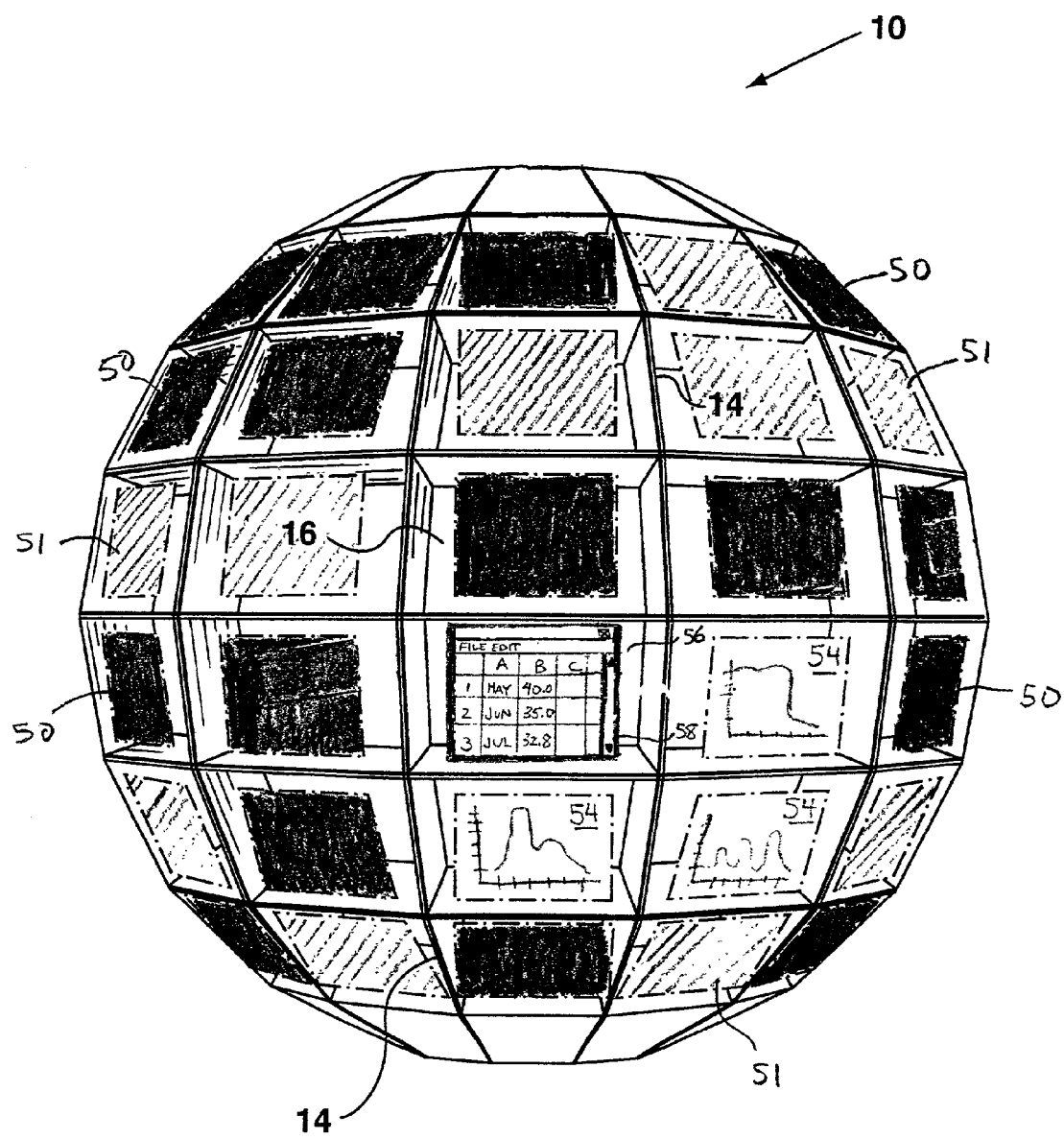
FIG. 8 illustrates a first example of a SUI representing data in an active state.

The present invention will be further explained by way of a first example, with reference to FIGS. 6 to 8.

Referring to FIG. 6, an example of a SUI 10 representing data in a symbolic state, that is, using coloured markers to colour-code the portals 16 of a SUI 10, is illustrated. For the sake of ease of understanding the present invention only, a SUI 10 with only a small number of portals 16 is shown in FIG. 6. However, the number of portals 16 in a SUI 10 may be orders of magnitude smaller or larger.

The portals 16 have been colour-coded using coloured markers that are displayed in the portals 16, and which are filled with different colours according to a pre-specified colour-coding scheme or criteria. Assume that the SUI 10 in this example represents a portfolio of stocks, where each portal 16 is associated with data relating to a stock in the portfolio, and where the data comprises the current price of the stock.

Suppose the pre-specified criteria for colour-coding the portals 16 in this example requires that if the current stock price is above $50, the colour black is to be associated with the corresponding portal. Otherwise, the colour red is associated with the corresponding portal.

Accordingly, in FIG. 6, black coloured markers 50 and red coloured markers 51 are displayed in the portals 16, corresponding to portals 16 where the data associated with them comprises a stock price having a value greater than and less than $50 respectively.

In this example, for the sake of ease of understanding the present invention, only two colours were used to colour the portals 16. However, it will be well understood by those skilled in the art that more than two colours can be used to colour the portals 16, as defined by the pre-specified colour-coding criteria.

Referring to FIG. 7, the user in this example has clicked the left mouse button on a first designated portal 52, causing snapshots 54 to appear in a subset of portals 16 on the SUI 10 in a passive state. In this example, the snapshots 54 illustrate graphs of the performance of the stock represented by the portals 16 in the subset.

Also in this example, the specific subset of portals 16 in which snapshots are to be displayed is defined by a 2×2 grid of portals 16, where the first designated portal 52 is the portal 16 at the lower left corner of the grid if the first designated portal 52 is closer to the bottom polar cap (not shown) than to the top polar cap (not shown) of the SUI 10, and where the first designated portal 52 is the portal 16 at the upper left corner of the grid if the first designated portal 52 is closer to the top polar cap (not shown) than to the bottom polar cap (not shown) of the SUI 10. However, it will be obvious to those skilled in the art that in other embodiments of the present invention, subsets of portals 16 may be defined differently, comprising different numbers of portals, and comprising different arrangements of portals 16 as predetermined or defined by the user.

Referring to FIG. 8, the user in this example has double-clicked the left mouse button on a second designated portal 56, causing an application window 58 to appear in the second designated portal 56 of the SUI 10 in an active state. In this example, the application window 58 allows the user to interact with the data associated with the second designated portal 56.

The actions of a user described herein to move between different states (e.g. symbolic, passive, active) of the SUI 10 are provided by way of example only. Other actions can be defined to allow a user to move between the different states in variant embodiments of the invention.

The present invention will be further explained by way of a second example, with reference to FIGS. 9 to 12.

Figure 9:
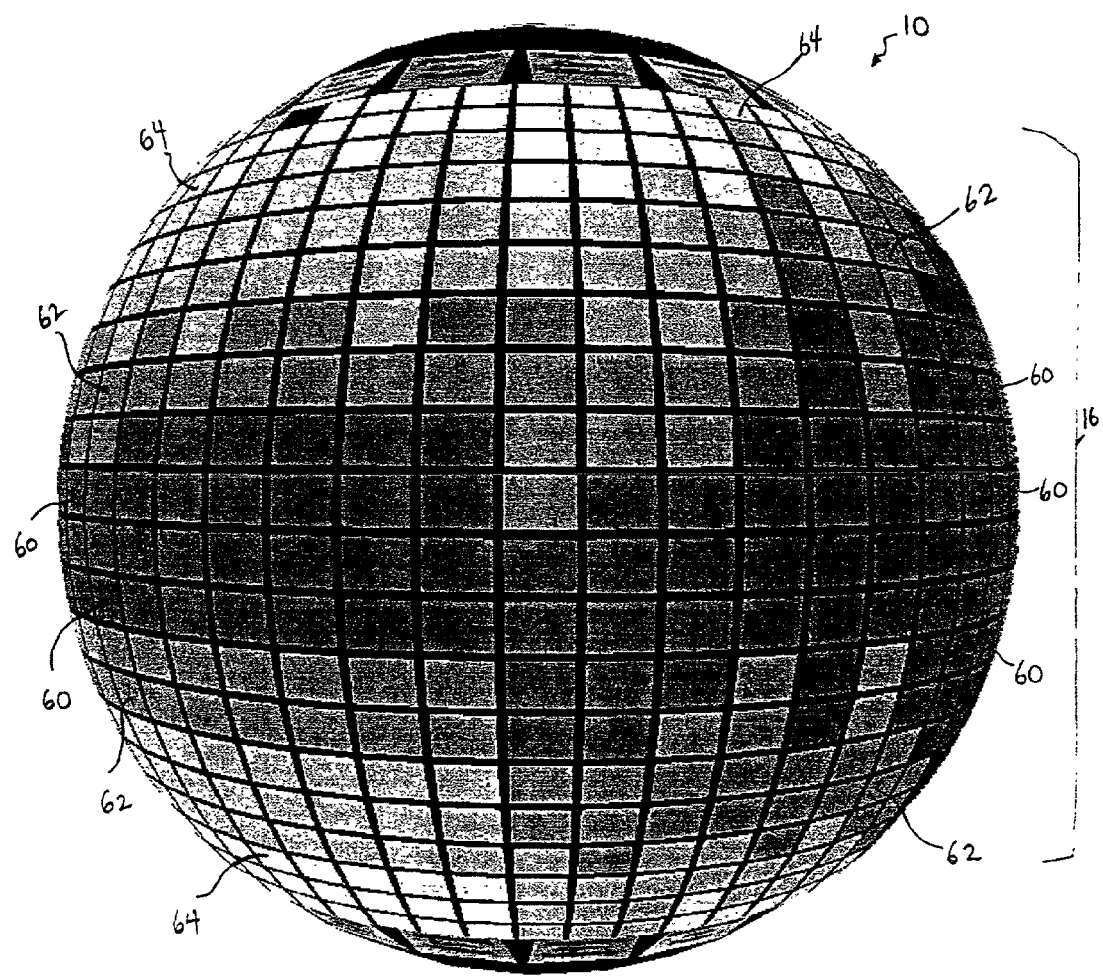
FIGS. 9 and 10 illustrate a second example of a SUI representing data in a symbolic state.
Figure 10:
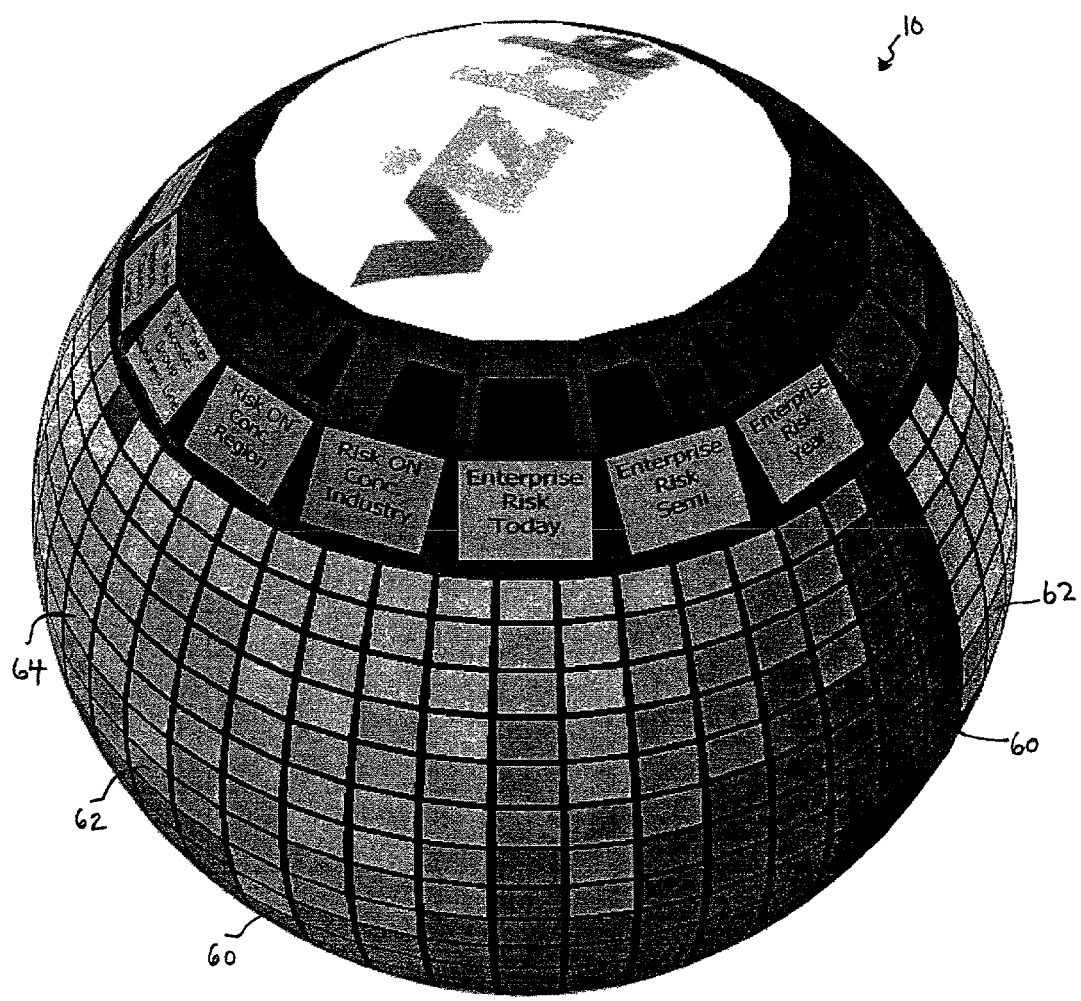

Referring to FIGS. 9 and 10, another example of a SUI 10 is shown in two different views in a symbolic state. The portals 16 of the SUI 10 are coloured in red, yellow, and green using red-coloured markers 60, yellow-coloured markers 62, and green-coloured markers 64 respectively, that are displayed in the portals 16. The SUIs 10 in FIG. 9 and in FIG. 10 are not shown in a window, but may be displayed in a window (e.g. SUI window 66 in FIG. 11) in variant embodiments of the present invention when the SUI 10 is in a symbolic state.

Figure 11:
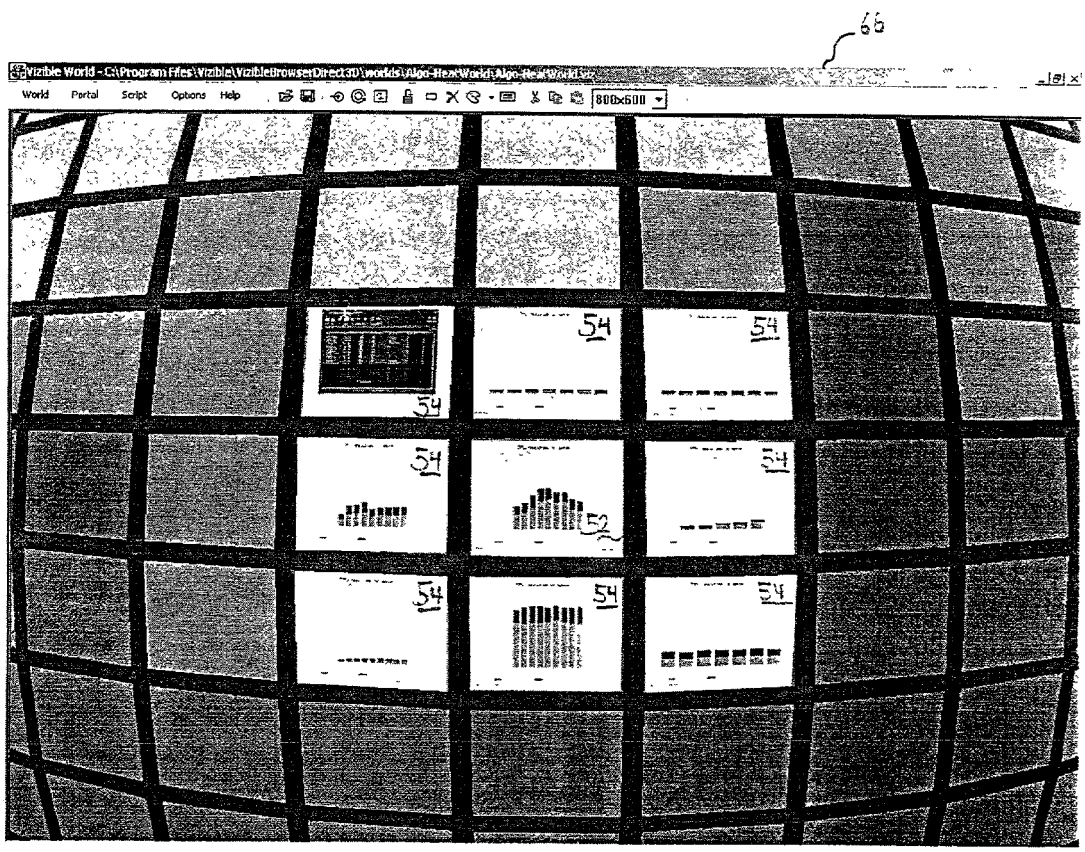
FIG. 11 illustrates a second example of a SUI representing data in a passive state.

Referring to FIG. 11, the user in this example has clicked the left mouse button on a first designated portal 52, causing snapshots 54 to appear in a subset of portals 16 on the SUI 10 in a passive state. The subject of portals 16 are shown magnified in a SUI window 66 in this example.

Figure 12:
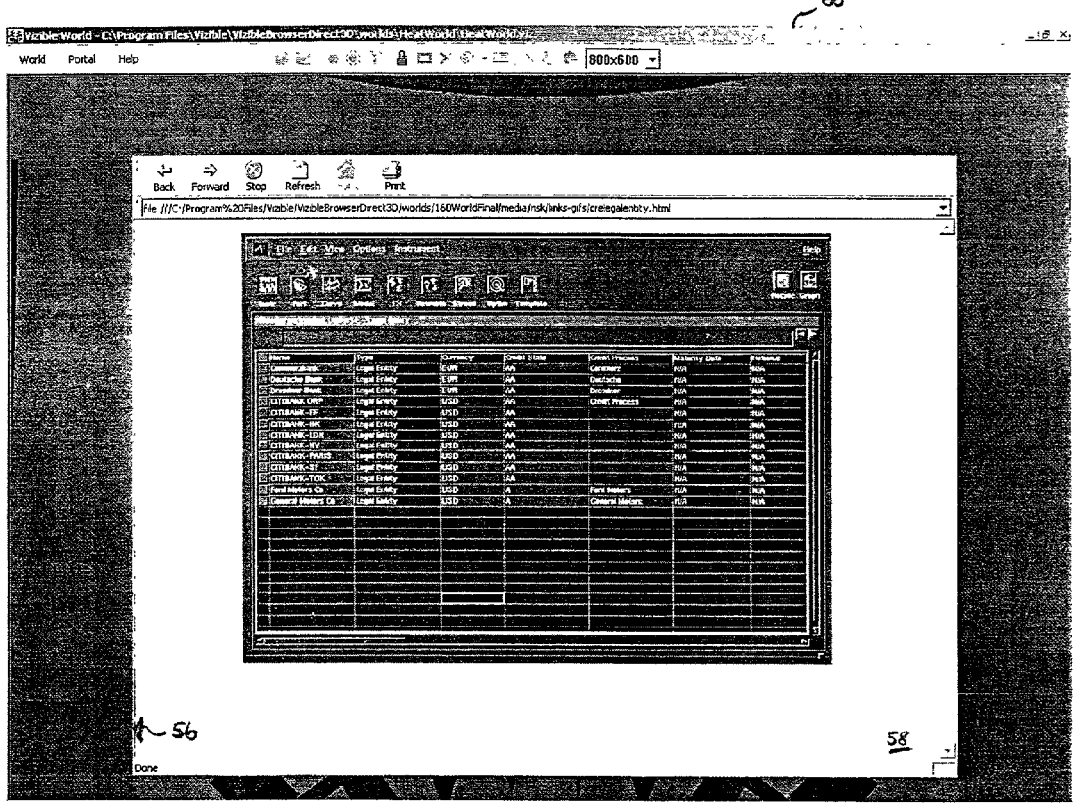
FIG. 12 illustrates a second example of a SUI representing data in an active state.

Referring to FIG. 12, the user in this example has double-clicked the left mouse button on a second designated portal 56, causing an application window 58 to appear in the SUI window 66 of the SUI 10 in the active state. In this example, the application window 58 allows the user to interact with the data associated with the second designated portal 56.

The screens in FIGS. 9 to 12 are examples of a SUI that may be used in assessing financial risk and visualizing stock market conditions (in real time or as a passive representation of past conditions). In this application, the status of each of multiple stocks would be associated with a colour in a spectrum of colours. For example, each colour can be chosen to reflect a stock's performance over a specified period of time (e.g. day, week, month, year, etc.) or a stock's performance determined in real-time, with up-to-date information. The number values (e.g. price) related to specific stocks can be compared with historical numbers, and a colour can be associated with the stock to reflect the relative change. This colour would be placed in a portal on a SUI in a symbolic state, while a SUI in a passive state could contain actual numerical data or a graphical assessment of the stocks' performance. A SUI in an active state would allow software applications to be executed and used, to permit a user to further access the data or content. Assessing financial risk is possible with a SUI designed in accordance with the present invention by using risk-modeling or risk management software to generate colour representations of stock conditions. The resultant output from the risk management software can relate to stock conditions under various scenarios, and a colour representation of these conditions can be displayed in portals of the SUI.

A frame or boundary around each portal can also be identified using one or more pre-specified colours to highlight portals which have had their colour changed during a pre-specified time, aiding in a historical analysis of stock conditions. The colour of a frame or boundary around a portal could also be used to classify data according to the type of financial instrument associated with the portal (e.g. commodity, currency, futures, etc.). A SUI used for this application could be used by traders, for instance, as a user interface on their computer desktop. Instead of working with many windows where data connected to real-time feeds might be shown and where a variety of applications including risk assessment and trade transaction software may be running, the data can instead be associated with portals in a SUI, and applications can be run in selected designated portals of the SUI. This can provide a more convenient alternative mechanism for dealing with all the information that may be available to a trader.

Similarly, a SUI designed in accordance with the present invention can be used to allow all stocks within a given index, (or all traded stocks worldwide), for example, to be represented by the SUI. The SUI would contain a sufficient number of portals to represent each of the stocks within the given index. In this application, the colour of the coloured marker in each of the portals could indicate a condition of the stock associated with the portal, while the colour of the portal frame or boundary could indicate the type of stock associated with the portal. Conversely, the colour of the coloured marker in each of the portals could indicate the type of stock associated with the portal, while the colour of the portal frame or boundary could indicate a condition of the stock associated with the portal.

In variant embodiments of the present invention used in other applications, a SUI may comprise portal frames for portals which can also be coloured in a predetermined manner (e.g. using a second colour coding scheme) to differentiate between portals on a SUI or to highlight specific portals on a SUI under pre-specified circumstances.

According to the present invention, other possible graphical effects can be used in order to differentiate between the apparent colour or appearance of coloured markers or portal frames. For example, changes in transparency, opacity, tint, tone, luminosity, reflectivity, or emissivity, or the use of alpha blending, flashing, blinking, or other transition effects could be implemented. Consider a SUI that represents a portfolio of stocks where each portal is associated with data relating to a stock in the portfolio, and where the data comprises the current price of the stock, for example. In that case, as the stock increases in value, both more tone or tint could be added to the coloured markers or portal frames, while an increasing level of luminosity is introduced as the stock price approaches a certain threshold price.

In variant embodiments of the invention, portals can be repositioned on a SUI in any defined grouping scheme. For example, in a preferred embodiment of the invention, portals can be repositioned so as to group portals having coloured markers of the same colour together. For instance, if red-coloured portals are of particular interest (i.e. portals containing a red-coloured marker), the red-coloured portals may be repositioned on the SUI to appear grouped near a polar cap, or in one or more row of portals centred between two polar caps. Grouping portals of similar colour together may facilitate easier examination of portals that may likely be of interest to a user. Alternatively, portals can be repositioned on a SUI in any defined grouping scheme. For example, in an application where a SUI represents a portfolio of stocks where each portal is associated with data relating to a stock in the portfolio, stocks which are traded most actively by a user could be located near the equator (i.e. circle on the surface of the SUI equidistant from the poles of the SUI, the poles typically being located at the centre of the polar caps of the SUI) of the SUI for better viewing, whereas the stocks that are traded less actively by a user could be grouped near the polar caps of the SUI.

As indicated earlier, although the invention has been described with reference to a particular preferred embodiment in which coloured markers are used as symbolic markers, other types of symbolic markers may be used. Accordingly, different symbolic markers can represent underlying data or content at different levels of abstraction, ranging from a very low level of abstraction (e.g. a symbolic marker where a significant portion of the actual underlying data or content is displayed) to a very high level of abstraction (e.g. a solid-coloured symbolic marker which merely indicates that the actual underlying data or content belongs to some predefined category), with varying intermediate levels of abstraction in between (e.g. a photo image that suggests that the actual underlying data or content belongs to a certain predefined category, but which itself does not illustrate any portion of the actual underlying data or content.)

Furthermore, since a symbolic marker can represent underlying data or content at various levels of abstraction, a SUI may be adapted to allow it to be displayed in numerous symbolic and/or passive states. This allows the underlying data or content of portals in a SUI to be represented at multiple levels or layers. Different states may represent the underlying data or content at different levels of abstraction, and different symbolic markers may be used in the representation of underlying data or content in different states. Accordingly, it will be appreciated by those skilled in the art that the present invention is not limited to three states or levels of data representation in a SUI, and that multiple states may be used where information can be represented or managed in multiple ways. Where a SUI is designed such that it can be displayed in different states, the different states in which the SUI can be displayed will typically comprise at least two non-active states. It is not necessary that these non-active states consist of both states that can be categorized as symbolic and states that can be categorized as passive. For example, a SUI may be designed in accordance with the present invention such that it can be displayed in either an active state or in one of a number of symbolic states.

Many different applications of the present invention are possible. For example, a SUI can be used to map the state of the Internet for example. Each portal can be associated with a web site on the Internet. A keyword search using a search engine in accordance with known methods may return search result information, as well as percentage match indices for the search results. The portals can be assigned different symbolic markers (e.g. different colours in accordance with one preferred embodiment of the invention), depending on the percentage match index. This permits a user to scan through many web sites using the SUI to find web sites having a high percentage match for example. At a lower level of abstraction (i.e. a SUI in a passive state), a snapshot of the main page of web sites may be loaded into a specific subset of portals, allowing the user to examine multiple web sites more closely. A specific portal can then be selected to cause a web page of the selected web site to be loaded into a web browser. Furthermore, in this application of the present invention, means for changing the search terms, or where several search terms are used, means for changing how each search term is weighted in calculating a percentage match index for a search result can also be provided. The search results can then be updated, and accordingly, the symbolic markers assigned to the portals (e.g. the colour of the coloured markers in the portals in a preferred embodiment of the invention) can be changed or updated. This allows the user to examine how changes in searching criteria affect the search results displayed in the SUI.

The present invention also has applications in hardware and server management. A SUI may represent a network, and each portal can be associated with a server or other hardware unit in the network. The portals can be assigned different symbolic markers (e.g. colour-coded) to indicate which servers or hardware units are down and/or require maintenance, for example. These portals can be selected and examined at lower levels of abstraction (e.g. with the SUI in a passive state or active state) to obtain more specific details on servers or hardware units that may require attention.

It will be obvious to those skilled in the art that there are other applications in which it would be useful to represent data at different levels of abstraction in which the present invention may be applied.

The present invention also contemplates the design of a SUI in which any of the methods of the present invention is implemented. The present invention also contemplates the design of a module for displaying symbolic markers in a SUI, where the module is programmed to execute the steps of any of the methods of the present invention. Steps of any of the methods of the present invention may also be stored on a computer-readable medium.

The present invention has been described with regard to preferred embodiments. However, it will be obvious to persons skilled in the art that a number of variants and modifications can be made without departing from the scope of the invention as defined in the claims appended hereto.

The invention claimed is:

1. A method of representing information on a three-dimensional user interface, said three-dimensional user interface comprising a plurality of portals, said method comprising:
 a) associating data with each of said plurality of portals;
 b) associating a symbolic marker with each of said plurality of portals that represents the data associated therewith categorized according to a criteria;
 c) associating a sensory cue with each of said plurality of portals that represent the data associated therewith;
 d) determining a state in which said three-dimensional user interface is to be displayed, wherein said three-dimensional user interface is displayable in
  an active state in which a user is permitted to interact with the data associated with at least one of said plurality of portals,
  a first non-active state in which a user is not permitted to interact with the data associated with said plurality of portals, and
  a second non-active state in which a user is not permitted to interact with the data associated with said plurality of portals; and
 e) displaying said three-dimensional user interface in the determined state;
  wherein the first non-active state is a symbolic state and the second non-active state is a passive state, such that in operation, when the three-dimensional user interface is displayed in the symbolic state, the symbolic marker associated with each of said plurality of portals is displayed, and when the three-dimensional user interface is displayed in the passive state, the sensory cue associated with at least one of said plurality of portals is displayed;
  wherein the method further comprises detecting, for at least one monitored portal of said plurality of portals, a change in at least one data associated with the respective monitored portal selected from the group consisting of data connected to a real-time feed and data associated with an Internet web page;
  wherein the method further comprises associating a different symbolic marker for display in said at least one monitored portal after said change; and
  wherein the method further comprises repositioning said plurality of portals in response to said change according to a grouping scheme on said three-dimensional user interface, such that said different symbolic markers displayed on said three-dimensional user interface are arranged in a plurality of groups on said three-dimensional user interface.

2. The method as claimed in claim 1, wherein a symbolic marker is a coloured marker.

3. The method as claimed in claim 2, wherein said method further comprises: associating a colour with each of said plurality of portals, wherein the colour associated with a portal is determined based on the data associated with the portal according to a colour coding scheme, and displaying a coloured marker in each of said plurality of portals such that the coloured marker displayed therein is coloured with the colour associated therewith.

4. The method as claimed in claim 3, wherein the coloured marker displayed in each of said plurality of portals is a vector graphic.

5. The method as claimed in claim 1, further comprising:
 upon receiving at least one first pre-specified user input, wherein said at least one first pre-specified user input identifies a first designated portal of said plurality of portals, displaying the sensory cue in each of a subset of said plurality of portals, wherein the sensory cue displayed in a portal of said subset facilitates recognition of the data associated with the portal of said subset.

6. The method as claimed in claim 5, wherein said subset of said plurality of portals comprises exactly one portal, and wherein said exactly one portal is said first designated portal.

7. The method of representing information on a three dimensional user interface as claimed in claim 6, wherein said subset of said plurality of portals comprises a group of portals on said three dimensional user interface.

8. The method as claimed in claim 5, wherein a first image of said three-dimensional user interface is projected onto a two dimensional display for viewing by a user before receiving said at least one first pre-specified user input, and wherein said first image is replaced by a second image of said subset of said plurality of portals which is shown in said two-dimensional display magnified as compared to said first image, after receiving said at least one first pre-specified user input.

9. The method as claimed in claim 5, further comprising:
upon receiving at least one second pre-specified user input, wherein said at least one second pre-specified user input identifies a second designated portal, executing an application and displaying the output of said application to a user, wherein said application permits user interaction with data associated with said second designated portal.

10. The method as claimed in claim 9, wherein said second image is replaced by a third image of said second designated portal which is shown in a two-dimensional display magnified as compared to said second image after receiving said at least one second pre-specified user input, wherein said second designated portal is used to display the output of said application to said user.

11. The method as claimed in claim 9, wherein the output of said application is shown in an application window separate from said three-dimensional user interface, wherein said application window is shown in a two-dimensional display.

12. The method as claimed in claim 1, wherein the acts of said method are repeated, such that the symbolic marker being displayed in each of a plurality of portals represents the data currently associated therewith.

13. The method as claimed in claim 12, wherein the acts of said method are repeated at a pre-specified time interval.

14. The method as claimed in claim 12, wherein the acts of said method are repeated upon the occurrence of a pre-specified event.

15. The method as claimed in claim 1, wherein said symbolic marker and said different symbolic markers are coloured markers, and wherein the act of associating a different symbolic marker for display in said at least one monitored portal comprises changing the colour of the symbolic marker associated with each of said at least one monitored portal.

16. The method as claimed in claim 1, wherein said different symbolic markers are coloured markers, and wherein said plurality of portals on said three-dimensional user interface are arranged such that portals displaying a coloured marker of a specific colour are grouped together on said three-dimensional user interface.

17. A user interface for a computing device, said user interface comprising a graphic representation of a plurality of portals arranged in a three-dimensional space, said user interface comprising a module for displaying symbolic markers in said plurality of portals, wherein said module is programmed to execute the following acts:
a) associating data with each of said plurality of portals;
b) associating a symbolic marker with each of said plurality of portals that represents the data associated therewith categorized according to a criteria;
c) associating a sensory cue with each of said plurality of portals that represent the data associated therewith;
d) determining a state in which said three-dimensional user interface is to be displayed, wherein said three-dimensional user interface is displayable in
an active state in which a user is permitted to interact with the data associated with at least one of said plurality of portals,
a first non-active state in which a user is not permitted to interact with the data associated with said plurality of portals, and
a second non-active state in which a user is not permitted to interact with the data associated with said plurality of portals; and
e) displaying said three-dimensional user interface in the determined state;
wherein the first non-active state is a symbolic state and the second non-active state is a passive state, such that in operation, when the three-dimensional user interface is displayed in the symbolic state, the symbolic marker associated with each of said plurality of portals is displayed, and when the three-dimensional user interface is displayed in the passive state, the sensory cue associated with at least one of said plurality of portals is displayed;
the module further being programmed to detect, for each of at least one monitored portal of said plurality of portals, a change in at least one of data associated with the respective monitored portal selected from the group consisting of data connected to a real-time feed and data associated with an Internet web page;
the module being further programmed to associate a different symbolic marker for display in said at least one monitored portal after said change; and
the module being further programmed to reposition said plurality of portals in response to said chance according to a grouping scheme on said three-dimensional user interface, such that said different symbolic markers displayed on said three-dimensional user interface are arranged in a plurality of groups on said three-dimensional user interface.

18. A computer-readable medium comprising a module for displaying symbolic markers in a plurality of portals of a user interface, said user interface comprising a graphic representation of a plurality of portals arranged in a three-dimensional space, wherein said module is programmed to execute the following acts:
a) associating data with each of said plurality of portals;
b) associating a symbolic marker with each of said plurality of portals that represents the data associated therewith categorized according to a criteria;
c) associating a sensory cue with each of said plurality of portals that represent the data associated therewith;
d) determining a state in which said three-dimensional user interface is to be displayed, wherein said three-dimensional user interface is displayable in
an active state in which a user is permitted to interact with the data associated with at least one of said plurality of portals,
a first non-active state in which a user is not permitted to interact with the data associated with said plurality of portals, and
a second non-active state in which a user is not permitted to interact with the data associated with said plurality of portals; and
e) displaying said three-dimensional user interface in the determined state;
wherein the first non-active state is a symbolic state and the second non-active state is a passive state, such that in operation, when the three-dimensional user interface is displayed in the symbolic state, the symbolic marker associated with each of said plurality of portals is displayed, and when the three-dimensional user interface is displayed in the passive state, the sensory cue associated with at least one of said plurality of portals is displayed;
the module further being programmed to detect, for each of at least one monitored Portal of said plurality of portals, a change in at least one of the data associated with the respective monitored portal selected from the group consisting of data connected to a real-time feed and data associated with an Internet web page;

the module further being programmed to associate a different symbolic marker for display in said at least one monitored portal after said change; and the module being further programmed to reposition said plurality of portals in response to said change according to a grouping scheme on said three-dimensional user interface, such that said different symbolic markers displayed on said three-dimensional user interface are arranged in a plurality of groups on said three-dimensional user interface.

19. The user interface as claimed in claim 17, wherein said different symbolic markers are coloured markers, and wherein said plurality of portals on said three-dimensional user interface are arranged such that portals displaying a coloured marker of a specific colour are grouped together on said three-dimensional user interface.

20. The computer-readable medium as claimed in claim 18, wherein said different symbolic markers are coloured markers, and wherein said plurality of portals on said three-dimensional user interface are arranged such that portals displaying a coloured marker of a specific colour are grouped together on said three-dimensional user interface.

* * * * *